United States Patent
Bunker

(10) Patent No.: US 6,427,327 B1
(45) Date of Patent: Aug. 6, 2002

(54) METHOD OF MODIFYING COOLED TURBINE COMPONENTS

(75) Inventor: Ronald S. Bunker, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/726,004

(22) Filed: Nov. 29, 2000

(51) Int. Cl.⁷ .................................................. B23P 15/00
(52) U.S. Cl. .................................. 29/889.1; 29/889.721
(58) Field of Search ........................ 29/889.1, 889.721, 29/889.72; 164/46

(56) References Cited

U.S. PATENT DOCUMENTS

| | | | | | |
|---|---|---|---|---|---|
| 4,311,433 A | * | 1/1982 | Bratton et al. | ......... | 29/889.721 |
| 4,376,004 A | * | 3/1983 | Bratton et al. | ............ | 416/97 A |
| 5,249,357 A | * | 10/1993 | Holmes et al. | ......... | 29/890.01 |
| 5,328,331 A | * | 7/1994 | Bunker et al. | .............. | 415/115 |
| 5,511,309 A | * | 4/1996 | Beabout | ................... | 29/889.72 |
| 5,626,462 A | * | 5/1997 | Jackson et al. | ......... | 416/229 A |
| 5,640,767 A | * | 6/1997 | Jackson et al. | ............. | 118/427 |
| 5,771,577 A | * | 6/1998 | Gupta et al. | ............. | 29/889.72 |
| 5,820,337 A | * | 10/1998 | Jackson et al. | ............. | 415/200 |
| 6,000,908 A | * | 12/1999 | Bunker | ........................ | 165/908 |
| 6,027,306 A | * | 2/2000 | Bunker | ........................ | 415/115 |
| 6,174,133 B1 | * | 1/2001 | Bunker | ........................ | 415/115 |
| 6,214,248 B1 | * | 4/2001 | Browning et al. | ............. | 216/17 |

* cited by examiner

*Primary Examiner*—I Cuda-Rosenbaum
(74) *Attorney, Agent, or Firm*—Pierce Atwood

(57) ABSTRACT

The cooling scheme of a gas turbine engine component is modified to improve local cooling without redesigning the investment casting. The modification includes forming at least one channel in the component such that the channel is in fluid communication with a cooling medium source associated with the component. The channel is then partially filled with a removable material, and the removable material is covered with a patch material so as to completely fill the channel. Lastly, the removable material is removed from the channel so as to create an internal cooling passage in the component that is in fluid communication with the cooling medium source.

12 Claims, 4 Drawing Sheets

METHOD OF MODIFYING COOLED TURBINE COMPONENTS

BACKGROUND OF THE INVENTION

This invention relates generally to gas turbine engines and more particularly to repairing and/or upgrading certain components used in such engines.

A gas turbine engine includes a compressor that provides pressurized air to a combustor wherein the air is mixed with fuel and ignited for generating hot combustion gases. These gases flow downstream to one or more turbine stages that extract energy therefrom to power the compressor and provide useful work. Each turbine stage commonly includes a stationary turbine nozzle followed in turn by a turbine rotor. The turbine rotor comprises a row of rotor blades (sometimes referred to as buckets) mounted to the perimeter of a rotor disk that rotates about the centerline axis of the engine. The nozzle, which channels combustion gases into the turbine rotor in such a manner that the turbine rotor can do work, includes a plurality of circumferentially spaced apart vanes radially aligned with the rotor blades. Turbine nozzles are typically segmented around the circumference thereof to accommodate thermal expansion. Each nozzle segment has one or more nozzle vanes disposed between inner and outer bands that define the radial flowpath boundaries for the hot combustion gases flowing through the nozzle.

The turbine section is mounted at the exit of the combustor and is therefore exposed to extremely high temperature combustion gases. To protect turbine components from the hot combustion gases, they are often cooled with a cooling medium. One common approach to cooling turbine airfoil components (e.g., rotor blades and nozzle vanes) is to bleed a portion of the compressed air from the compressor and direct the bleed air to internal passages in the components. The air circulates through the internal passages to remove heat from the component structure. The air can exit through small film cooling holes formed in the airfoil surface so as to produce a thin layer, or film, of cooling air on the surface. Film cooling can also be used for the inner and outer bands. In this case, a band includes film cooling holes extending radially therethrough. Cooling air passes through the film cooling holes to form a cooling air film on the hot side of the band. Other known cooling approaches include using steam from a combined cycle bottoming engine as the cooling medium for the gas turbine components in a closed-circuit mode. A separate off-board compressed air system delivering closed-circuit cooling air to turbine components has also been employed.

Currently, cooled gas turbine components, such as rotor blades and nozzle segments, are typically fabricated from investment castings. Cast components include the major design features of the cooling scheme (such as passage size and routing and the location and size of features like internal rib turbulators) within their casting definition. Therefore, changing the cooling scheme would require a redesign of the investment casting, which involves significant time and cost.

As cooled turbine components are exposed to severe conditions during engine operation, it is sometimes discovered that certain local regions are inadequately cooled for the intended function or life of the component. This can result in distress such as burning, cracking and the like in the local region. Such distress will lead to premature service or reduced life for the component. Often, modifying the component's cooling scheme can alleviate local distress. However, as mentioned above, such modification ordinarily requires an expensive and time consuming redesign of the investment casting. Accordingly, it would be desirable to have a method for modifying the component cooling scheme so as to improve local cooling without going through the lengthy and costly development cycle of redesigning the investment casting.

BRIEF SUMMARY OF THE INVENTION

The above-mentioned need is met by the present invention, which provides a method of modifying a gas turbine engine component having a cooling medium source associated therewith. The method includes forming at least one channel in the component such that the channel is in fluid communication with the cooling medium source. Then partially filling the channel with a removable material and covering the removable material with a patch material so as to completely fill the channel. Lastly, the removable material is removed from the channel so as to create an internal cooling passage in the component.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
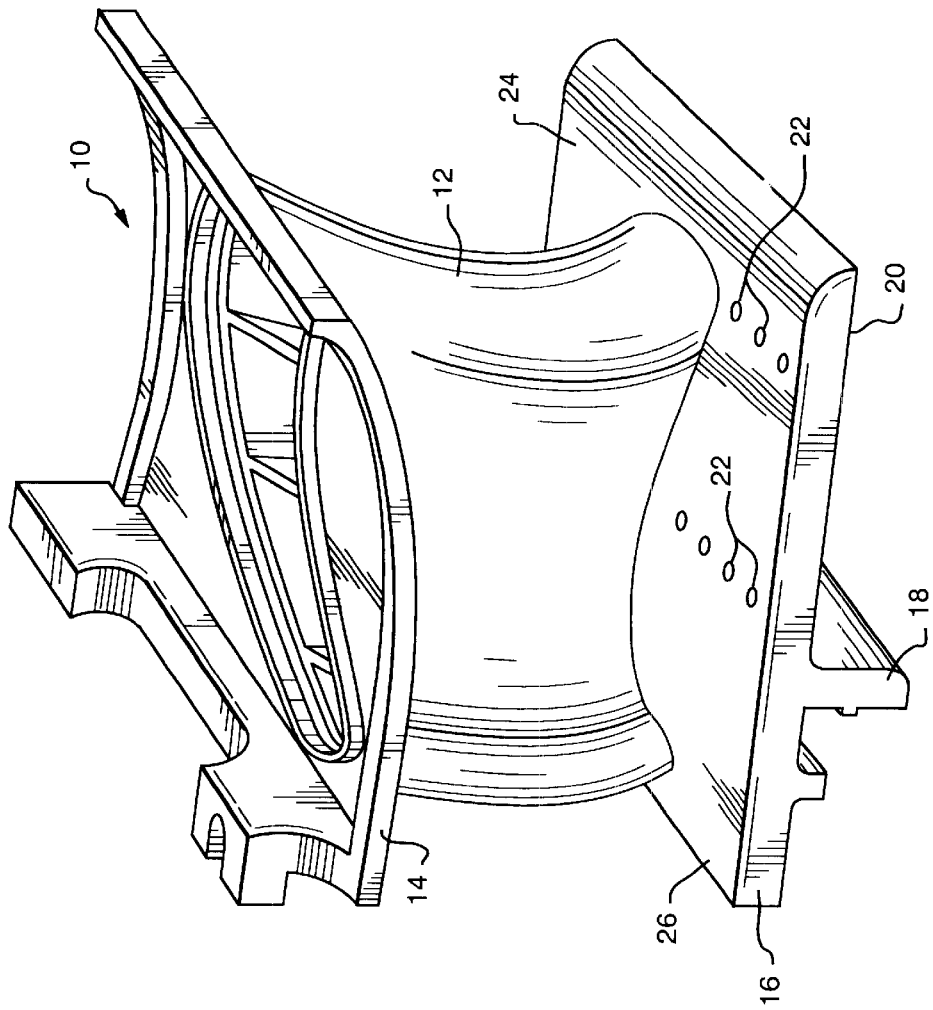
FIG. 1 is a perspective view of a prior art turbine nozzle segment.

Referring to the drawings wherein identical reference numerals denote the same elements throughout the various views, FIG. 1 shows a conventional turbine nozzle segment 10. The nozzle segment 10 is an investment casting that includes a vane 12 disposed between an outer band 14 and an inner band 16. A mounting flange 18 is formed on the radially inner side (or "cold side") 20 of the inner band 16 for mounting the nozzle segment 10 to stationary engine structure. The vane 12 defines an airfoil surface and has a hollow interior cavity through which a cooling medium can flow to cool the vane 12. A plurality of film cooling holes 22 extend radially through the inner band 16 so as to connect the radially outer side (or "hot side") 24 of the inner band 16 to a plenum (not shown in FIG. 1) located on the cold side 20 of the inner band 16. The plenum functions as a source of a cooling medium, such as compressor discharge air, which passes through the film cooling holes 22. The film cooling holes 22 thus provide a cooling medium film on the inner band hot side 24 that extends therefrom to the aft edge of the inner band 16. However, the film cooling holes 22 are typically located forward of the mounting flange 18 because the cooling medium plenum is limited to a forward location due to structural requirements of the inner band 16. This places the film cooling holes substantially upstream of the inner band aft edge. Accordingly, the aft corner region 26 on the inner band hot side can receive inadequate cooling and experience local distress due to over-temperature, thermal stress, creep or bulk temperature induced low cycle fatigue.

Referring to FIGS. 2–8, a method is described for modifying the cooling scheme of the nozzle segment 10 without redesigning the investment casting. The purpose of the cooling scheme modification is to improve cooling in the aft corner region 26 and minimize occurrences of local distress. This method can be implemented as a repair or an upgrade. That is, the method can be used in repairing distressed parts returned from service so as to avoid recurrences of the local distress or to upgrade new-make parts prior to entering service so as to avoid the local distress in the first place. Thus, as used hereinafter, "modifying" a component refers to structurally changing the component after the casting process. Furthermore, although the method is described herein in the context of alleviating local distress on the inner band of a turbine nozzle segment, it should be noted that the method is not limited to inner bands or even nozzle segments. The method can be applied to any cooled turbine component having a tendency to show local distress due to inadequate cooling.

Figure 2:
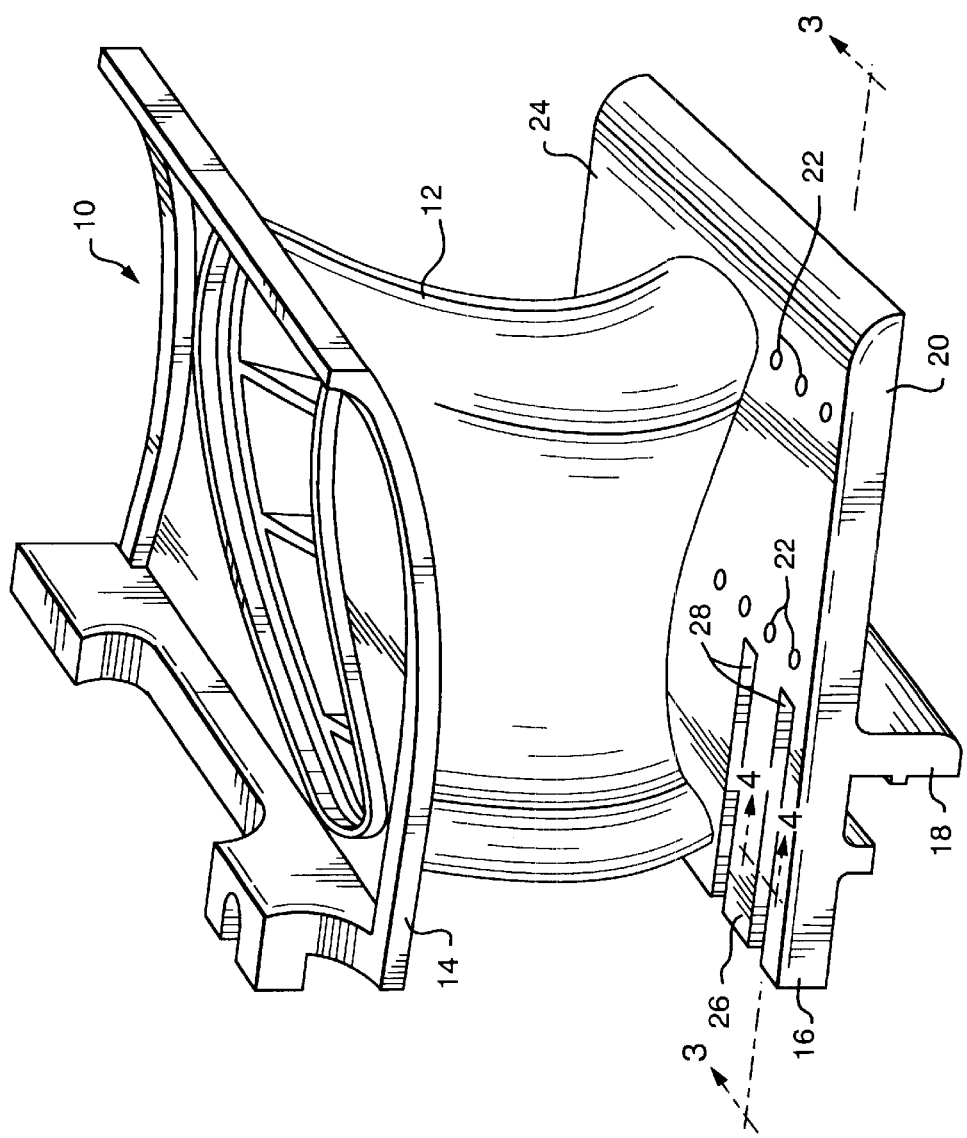
FIG. 2 is a perspective view of a turbine nozzle segment having two channels formed therein.
Figure 3:
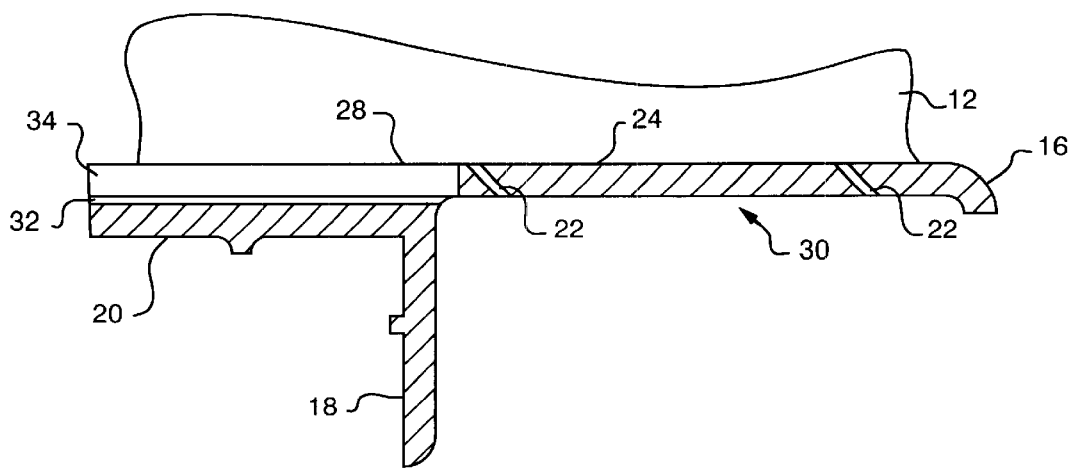
FIG. 3 is a longitudinal section view taken along line 3—3 of FIG. 2.
Figure 4:
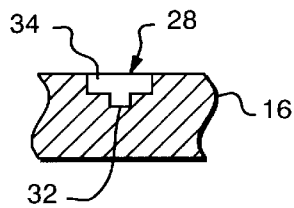
FIG. 4 is a cross section view taken along line 4—4 of FIG. 2.

Turning specifically to FIGS. 2–4, the first step in the method is to form one or more channels 28 in the inner band hot side 24. The channels 28 begin at a point forward of the mounting flange 18 and extend to the aft edge of the inner band 16, thereby traversing the aft corner region 26 that is susceptible to local distress. As seen in FIG. 3, the channels 28 are relatively shallow, but are of sufficient depth to connect to the cooling medium plenum 30 located on the inner band cold side 20, forward of the mounting flange 18. The channels 28 can be formed in any suitable manner including conventional machining, electrical discharge machining, water jet machining, electro-chemical machining, Pulsed Electro-chemical machining and laser machining. As seen in FIG. 4, each channel 28 has two sections: a lower section 32 and an upper section 34. The two sections 32, 34 extend parallel to one another, with the lower section 32 being the deeper, narrower section and the upper section 34 being the shallower, wider section. In this context, deeper and shallower refer to the distance that the bottom of each section 32, 34 is located from the hot side 24, not a particular dimension of a side wall of an individual section although the Figures show the channels 28 having rectangular cross-sectional shapes, it should be noted that the channels can have a variety of forms and geometries. Also, the lower sections 32 can be provided with structural features, such as turbulators, pin fins or the like, designed to enhance cooling by increasing heat transfer.

Figure 5:
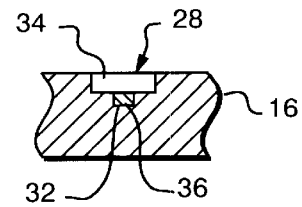
FIG. 5 is a cross section view showing a removable material placed in the channel.

Once the channels 28 have been formed, each lower section 32 is filled with a removable material 36, as shown in FIG. 5. As used herein, "removable material" refers to any substance that can be removed after the channels 28 have been "patched" in the manner described below and without otherwise altering the nozzle segment 10. Suitable examples include ceramic materials, high temperature salts, or leachable materials such as copper-nickel alloys and low carbon steels.

Figure 6:
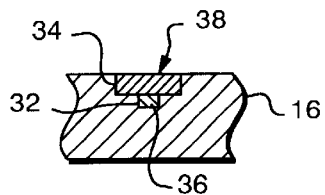
FIG. 6 is a cross section view showing a patch material filling the channel.

Turning to FIG. 6, the next step is to fill each upper section 34 with a patch material 38 that covers the removable material 36 and completely fills the channels 38. The patch material 38 is applied by any suitable method such as metal plasma spray, electron beam physical vapor deposition, diffusion bonding or cladding. Thus, the patch material 38 becomes an integral part of the inner band 16 and thereby "patches" the channels 28. Preferably, the patch material 38 is the same material (or at least a compatible material with similar properties) as the parent material of the nozzle segment 10 although in some cases, non-identical materials can be used. In the case of gas turbine engine components, this is usually a metallic material such as stainless steel, titanium and high temperature superalloys.

Figure 7:
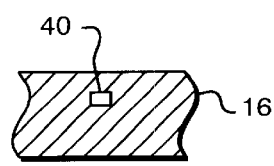
FIG. 7 is a cross section view showing the removable material removed from the channel.
Figure 8:
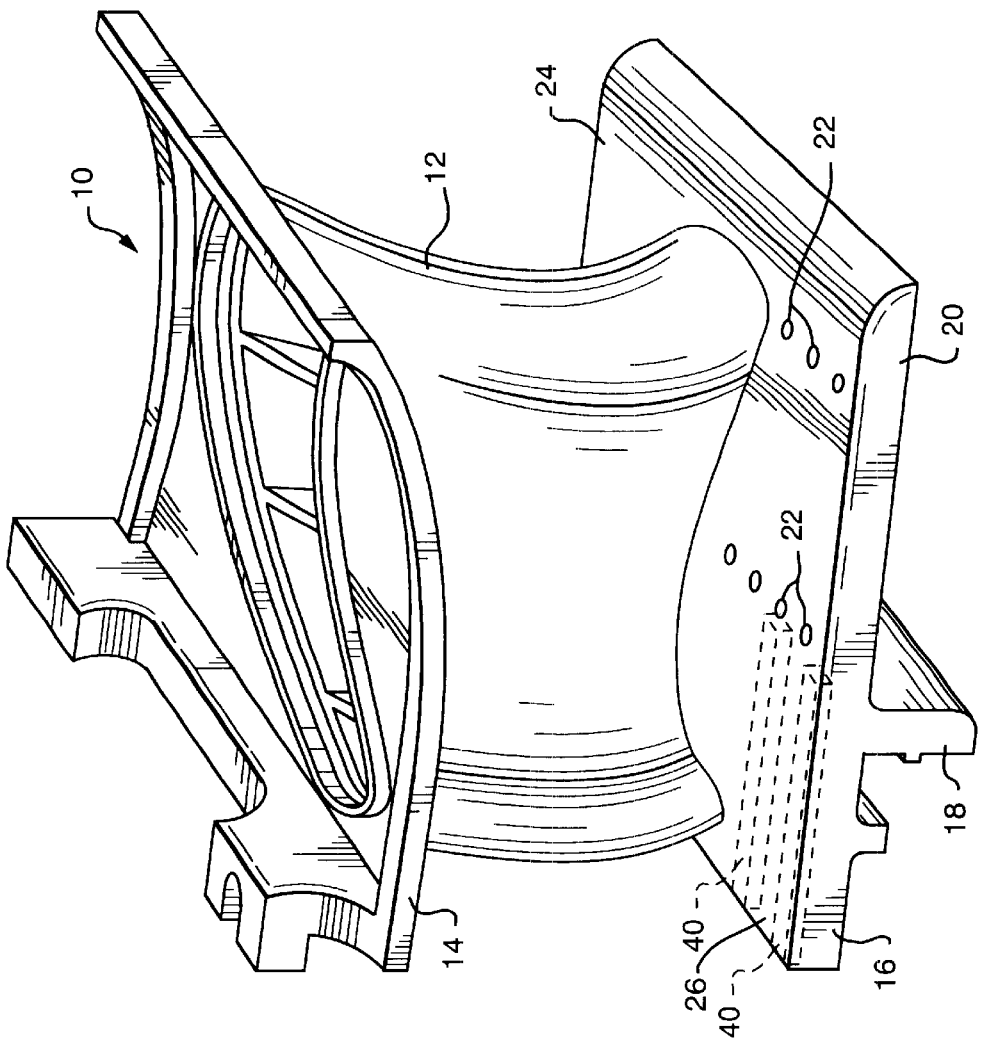
FIG. 8 is a perspective view of a modified turbine nozzle segment.

After the patch has been completed, the removable material 38 is removed from the lower section 32 of each channel 28, as shown in FIGS. 7 and 8. This can be accomplished by a number of methods, depending on the nature of the removable material 36. For instance, leachable materials are removed by causing an appropriate solvent to percolate through the material 36, thereby leaching the material 36 from the channel 28. High temperature salts would be removed by heating the nozzle segment 10 to the point that the salt would liquefy and drain away. Ceramic materials would be removed by placing the nozzle segment in an appropriate acid bath. After removal of the removable material 36, the nozzle segment is processed for the addition of protective environmental coatings and/or thermal barrier coatings, as would normally be applied to the part.

Removal of the removable material 36 creates internal cooling passages 40 in the inner band 16 that extend from the cooling medium plenum 30 to the aft edge of the inner band 16. The internal passages 40 thus provide a flow of cooling medium through the aft corner region 26, thereby alleviating the local distress that would otherwise tend to occur in this region.

As mentioned above, the turbine nozzle segment 10 is simply used herein as an example to describe the present invention. The present invention is not limited to nozzle segments but can be applied to any cooled turbine component having a tendency to show local distress due to inadequate cooling. The applied cooling channels can take various forms and geometries as long as they connect to a cooling medium source. Furthermore, the surface area of the patch should be generally limited in size so that the patch strength is not required to be on the same order as the strength of the component substrate material. This will insure that the patch surface is structurally capable of withstanding the mechanical and thermal stresses.

The foregoing has described a method for improving local cooling without redesigning the investment casting. While specific embodiments of the present invention have been described, it will be apparent to those skilled in the art that various modifications thereto can be made without departing from the spirit and scope of the invention as defined in the appended claims.

What is claimed is:

1. A method of modifying a gas turbine engine component having a cooling medium source associated therewith, said method comprising:

forming at least one channel in a surface of said component, said channel being in fluid communication with said cooling medium source and having a bottom wall spaced away from said surface;

partially filling said channel with a removable material, such that said removable material completely covers said bottom wall of said channel;

filling the remainder of said channel with a patch material; and removing said removable material from said channel so as to create an internal cooling passage in said component.

2. The method of claim 1 wherein said internal passage traverses a region of said component that is susceptible to local distress.

3. The method of claim 1 wherein said removable material is removed by leaching.

4. The method of claim 1 wherein said removable material is removed by heating said removable material.

5. The method of claim 1 wherein said removable material is removed by placing said component in an acid bath.

6. The method of claim 1 wherein said patch material is identical to the material from which said component is made.

7. A method of modifying a gas turbine engine component having a cooling medium source associated therewith, said method comprising:

forming at least one channel in a surface of said component, said channel being in fluid communication with said cooling medium source and having a deeper, narrower section and a shallower, wider section;

filling said deeper, narrower section of said channel with a removable material;

filling said shallower, wider section of said channel with a patch material so as to cover said removable material; and removing said removable material from said channel so as to create an internal cooling passage in said component.

8. The method of claim 7 wherein said internal passage traverses a region of said component that is susceptible to local distress.

9. The method of claim 7 wherein said removable material is removed by leaching.

10. The method of claim 7 wherein said removable material is removed by heating said removable material.

11. The method of claim 7 wherein said removable material is removed by placing said component in an acid bath.

12. The method of claim 7 wherein said patch material is identical to the material from which said component is made.

\* \* \* \* \*